United States Patent
Davis

(10) Patent No.: US 7,296,959 B2
(45) Date of Patent: Nov. 20, 2007

(54) DEER STAND AND DEER CARRIER RACK FOR AN ATV

(76) Inventor: James Darrin Davis, RT. 1 Box 139, Elizabethtown, IL (US) 62931

(*) Notice: Subject to any disclaimer, the term of this patent is extended or adjusted under 35 U.S.C. 154(b) by 30 days.

(21) Appl. No.: 10/672,526

(22) Filed: Sep. 29, 2003

(65) Prior Publication Data

US 2005/0087576 A1 Apr. 28, 2005

(51) Int. Cl.
 *B60P 9/00* (2006.01)
 *B65F 1/00* (2006.01)
 *B60R 7/00* (2006.01)

(52) U.S. Cl. .................. 414/462; 224/401; 224/502; 414/546

(58) Field of Classification Search .......... 414/462, 414/546, 434, 438, 469, 389, 551, 809, 812; 224/401, 504, 506, 511, 532, 537, 924, 402, 224/412, 413, 447, 488, 921; 211/168, 169, 211/170, 171

See application file for complete search history.

(56) References Cited

U.S. PATENT DOCUMENTS

| | | | | |
|---|---|---|---|---|
| 1,467,504 A | * | 9/1923 | Sabarros | 414/438 |
| 1,762,545 A | * | 6/1930 | Carpenter et al. | 248/165 |
| D131,509 S | * | 3/1942 | Fulton | D6/411 |
| 2,930,500 A | * | 3/1960 | Ellis | 414/462 |
| 4,411,461 A | * | 10/1983 | Rosenberg | 493/108 |
| 4,696,374 A | * | 9/1987 | Hale | 182/127 |
| 4,826,057 A | * | 5/1989 | Yamada | 224/412 |
| 4,856,686 A | * | 8/1989 | Workentine | 224/497 |
| 5,236,062 A | * | 8/1993 | Laney | 182/127 |
| 5,421,495 A | * | 6/1995 | Bubik et al. | 224/310 |
| 5,595,333 A | * | 1/1997 | Boston | 224/536 |
| 5,816,462 A | * | 10/1998 | Brantley | 224/570 |
| 5,911,556 A | * | 6/1999 | Caldwell | 414/462 |
| 5,964,565 A | * | 10/1999 | Skotzky | 414/462 |
| 6,089,428 A | * | 7/2000 | Wagner | 224/401 |
| 6,126,053 A | * | 10/2000 | Shaver | 224/509 |
| 6,145,718 A | * | 11/2000 | Edwards | 224/401 |
| 6,312,210 B1 | * | 11/2001 | Lang | 414/540 |

(Continued)

*Primary Examiner*—Saul Rodriguez
*Assistant Examiner*—Gregory W Adams
(74) *Attorney, Agent, or Firm*—Haverstock, Garrett & Roberts LLP

(57) ABSTRACT

A deer-stand and deer-carrier rack for an ATV enables a hunter to transport a deer-stand and to easily transport a deer using an ATV. U-clamps and adjustable attaching bars attach a deer-carrier rack to the rear of an ATV. The essentially rectangular frame of the deer-stand rack has a rearwardly facing oblique pair of arms and a pair of frontwardly facing L-shaped brackets. The rearwardly facing arms can carry a deer stand while the frontwardly facing L-shaped bracket holders can carrier different types of hunting gear. A deer carrier is also adjustably attachable to the front carrier of an ATV. The deer carrier has a rectangular frame, which is attached to the carrier of the ATV, and a hinged lower frame that folds down when the deer is to be loaded. The lower hinged frame also has wings to accommodate the deer. Once the deer is loaded onto the lower carrier in the horizontal position, the lower carrier is lifted upwardly to an essentially vertical position. The lower carrier may then be secured to the front of the ATV by straps to enable the ATV and hunter to transport the deer.

9 Claims, 5 Drawing Sheets

U.S. PATENT DOCUMENTS 6,435,801 B2 * 8/2002 Talbott ....................... 414/462
6,638,001 B1 * 10/2003 McKinley .................. 414/462
6,638,011 B2 * 10/2003 Woodard et al. ........... 415/104
2001/0046431 A1 * 11/2001 McElhany .................. 414/462
2002/0168257 A1 * 11/2002 Smith et al. ................ 414/462
2002/0192062 A1 * 12/2002 Reed .......................... 414/434

* cited by examiner

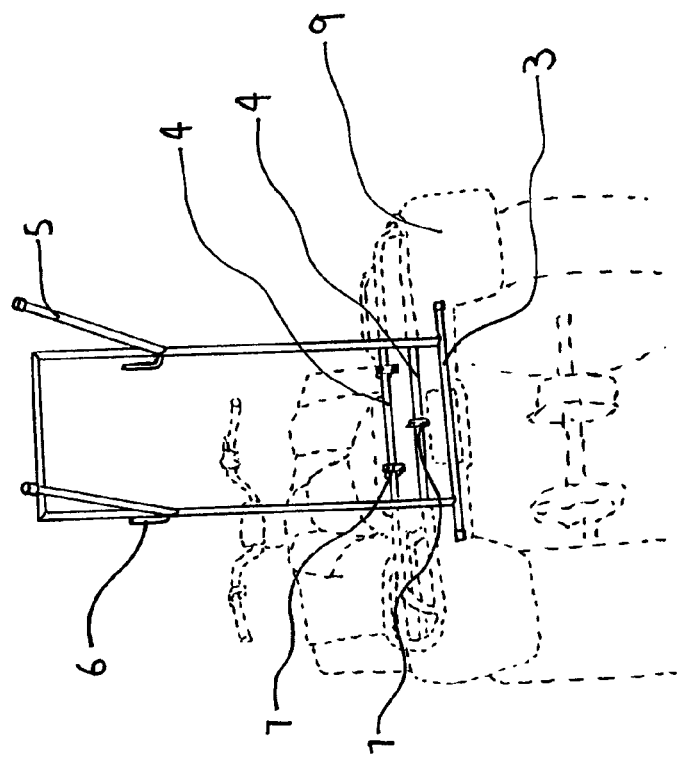
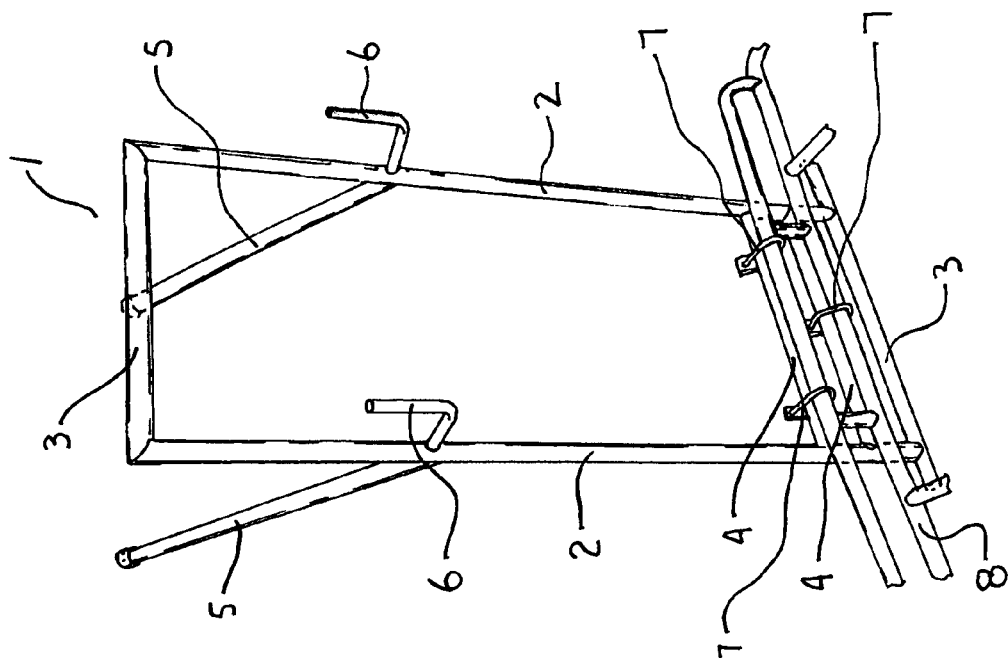

DEER STAND AND DEER CARRIER RACK FOR AN ATV

BACKGROUND OF THE INVENTION

This invention relates generally to the field of hunting. More particularly, a deer stand and deer carrier rack is presented which is readily attachable to an ATV vehicle.

In the field of hunting, different types of devices have been utilized to transport the game once the game has been killed. These transport devices include anything from an Indian travois, to a wheelbarrow or a simple pole carried by two hunters. With the recent introduction of ATV four-wheel motorized vehicles for use in hunting, certain innovations adaptable to be attached to an ATV have been described in the literature. Some of these devices utilize rectangular frames that are mounted to the ATV racks. These frames are then used to transport the fallen deer, deer stands, guns, bows and arrows, or other hunting equipment.

Since nearly all ATVs have a front and rear rack, it would be an improvement over the prior art to provide a rack for carrying a deer stand which is attachable to the ATV carrier frame. It is an object of this invention to provide a rack that may be attached to an ATV for carrying a deer stand.

Since ATV racks are not standardized, it would also be an improvement if the deer stand carrier were adaptable to the different types of ATV racks in common use. It is another object of this invention to provide a deer stand rack that is adjustable such that it may be attached to many different types of ATV vehicles.

One difficult problem in the hunting field is the transportation of the game, particularly a heavy deer that may weigh in excess of 200 pounds. While other dear transporting racks have been disclosed, the problem with loading and securing a heavy deer onto the deer carrier rack has not yet been effectively addressed. It is a still further object of this invention to provide a deer carrier which is readily attachable to an ATV and which is hinged such that the deer may be more easily loaded.

Other and further objects of this invention will become apparent upon reading the following description of the invention.

BRIEF DESCRIPTION OF THE DEVICE

A pair of front and rear racks may be readily and adjustably attached to the front and rear carriers of a standard ATV vehicle. The rear rack has an essentially rectangular frame with rearwardly protruding oblique hangers and front "L" shaped hangers. The rectangular frame is adjustable such that it may be universally attached to the rear carrier of nearly all ATV vehicles. The oblique rearwardly facing carrier allows a hunter to load and secure a deer stand to the ATV vehicle for easy transportation. The front, "L" shaped carriers can conveniently carry a hunter's rifle, a bow and arrow, camping equipment, or other equipment commonly used hunting.

Readily and adjustably attached to the front carrier of the ATV is a deer carrier rack. The deer carrier rack also has a rectangular attaching frame that is adjustably secured to the front carrier of an ATV. The deer carrier also has a lower hinged deer support frame with a dogleg portion that may be deployed to the front of the ATV, nearly parallel to the ground. A pair of left and right dogleg shaped rods is rotatably attached to the frame and form the deer-carrying portion of this carrier.

The outer end of the dogleg portion has an "L" shaped ground brace that keeps the dogleg frames off of the ground.

Also attached to the left and right dogleg rods respectively are left and right wings, which are utilized to support the deer. Once the deer is loaded and secured to the deer-carrying portion of the rack, the dogleg rack may then be lifted and strapped to the front of the ATV for transportation of the deer.

BRIEF DESCRIPTION OF THE DRAWINGS

FIG. 1 is a perspective view of the deer stand rack.

FIG. 2 is perspective view of the deer stand rack attached to the rear of the ATV vehicle.

DETAILED DESCRIPTION OF THE PREFERRED EMBODIMENT

Figure 3:
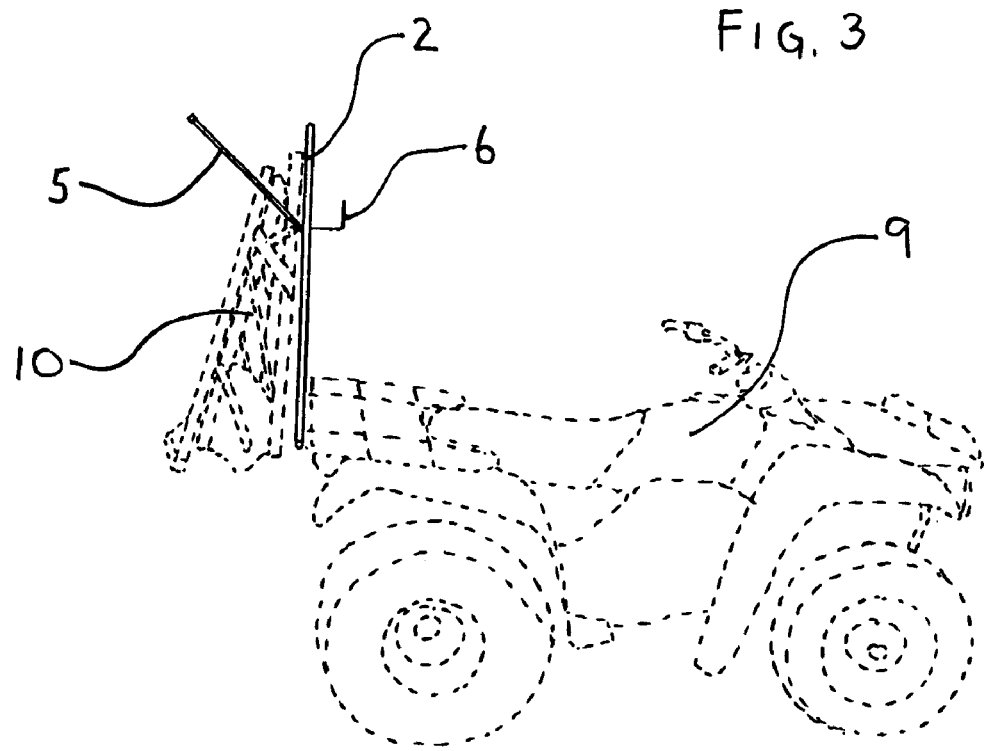
FIG. 3 is a side view of the deer stand rack attached to an ATV vehicle.

A deer stand rack 1, as best shown in FIG. 1, has a rectangular attaching frame with vertical legs 2 and horizontal legs 3. The rectangular frame also has horizontal attaching bars 4, as best shown in FIG. 2.

In order to enable the hunter to transport a deer stand, oblique stand holder rails 5 are attached to the rear portion of the rectangular frame and face rearwardly in at an upper oblique angle as shown. Attached to the inward portion of the rectangular frame is a pair of "L" shaped rack holders 6. The rack holders face forwardly.

The rear deer stand rack 1 is attached to an ATV vehicle by means of "U" clamps 7. These "U" clamps 7 secure the adjustable attaching frame bars 4 to the ATV rack 8, as shown in FIGS. 1 and 2.

Turning now to FIG. 3, an ATV vehicle is shown in dotted lines 9. The rectangular attaching frame is secured to the ATV vehicle as shown. A deer-hunting stand 10, which is foldable for transportation, is readily secured to the deer stand rack by sliding its frame over the oblique stand holder rails 5. Available to transport other hunting gear are the "L" shaped rack holders 6.

Figure 4:
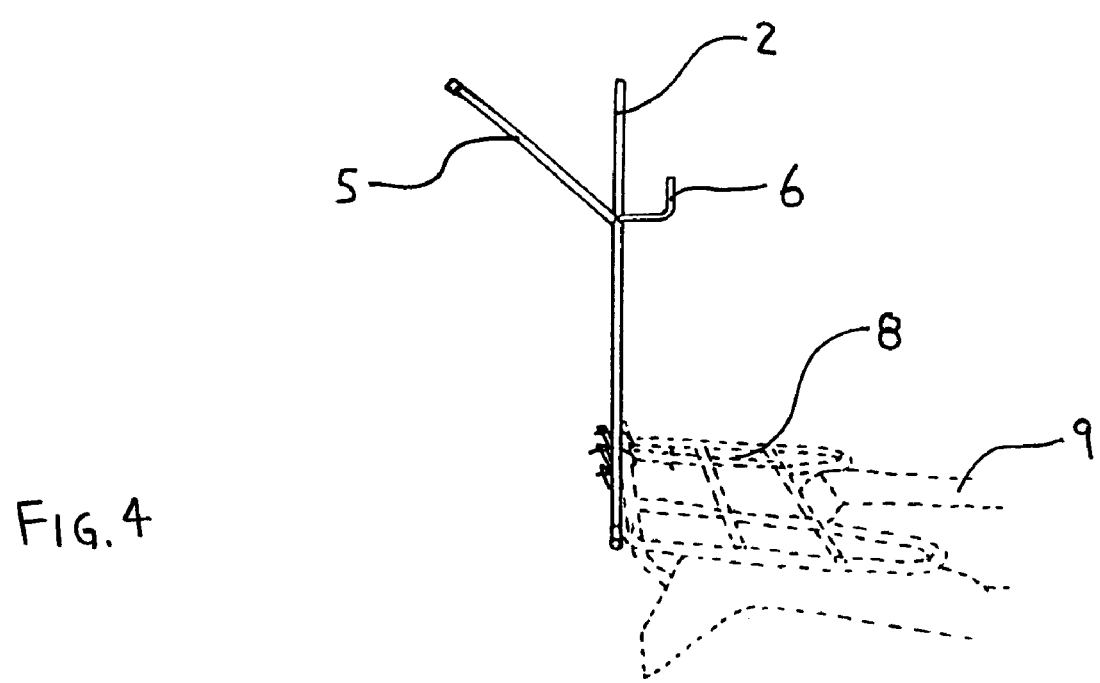
FIG. 4 is a partial side view of the deer stand and ATV vehicle.

FIG. 4 shows the deer stand rack attached to the rear rack of an ATV vehicle.

Designed to be attached to the front of the ATV is a deer carrier rack 11. This deer carrier rack is designed to transport a deer once it has been taken. The deer carrier rack 11 has a rectangular attaching frame with vertical legs 12 and horizontal legs 13. Inside the upper and lower horizontal legs are horizontal attaching bars 14. These horizontal attaching bars 14 may be moved up and down within the rectangular frame and may be tightened using the screws shown in FIG. 5. The attaching bars are movable and securable in order to adapt the deer carrier rack to the different types of ATV carriers currently in use.

Figure 5:
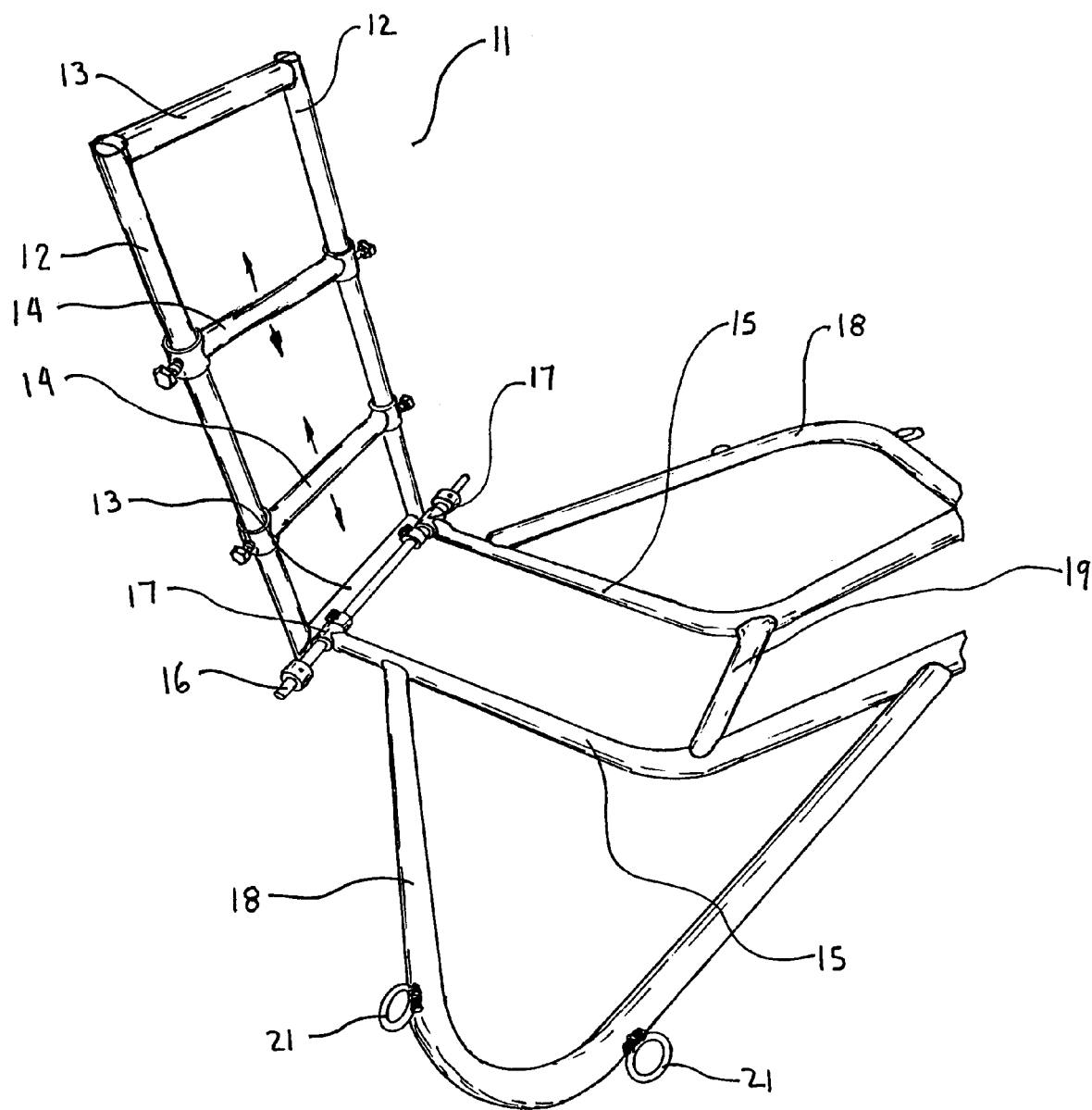
FIG. 5 is a perspective view of the deer carrier rack.

The lower portion of the deer carrier rack includes a pair of hinged, left and right dogleg rods 15. These dogleg rods have an oblique angle to them as shown in order to allow for the essentially horizontal deployment of the lower, hinged deer support frame when it is deployed to load a deer. The dogleg rods 15 are rotatably attached to a bottom axle 16 of the frame as best shown in FIG. 5. Each dogleg rod has a hinge 17 that is rotatably attached to the bottom axle 16.

The deer carrier also has left and right irregularly shaped wing pieces 18 that are attached to the left and right dogleg rods 15, respectively. In order to stabilize the deer-carrying portion of the rack, dogleg cross bar braces 19 may be secured inside the pair of dogleg rods 15.

Figure 6:
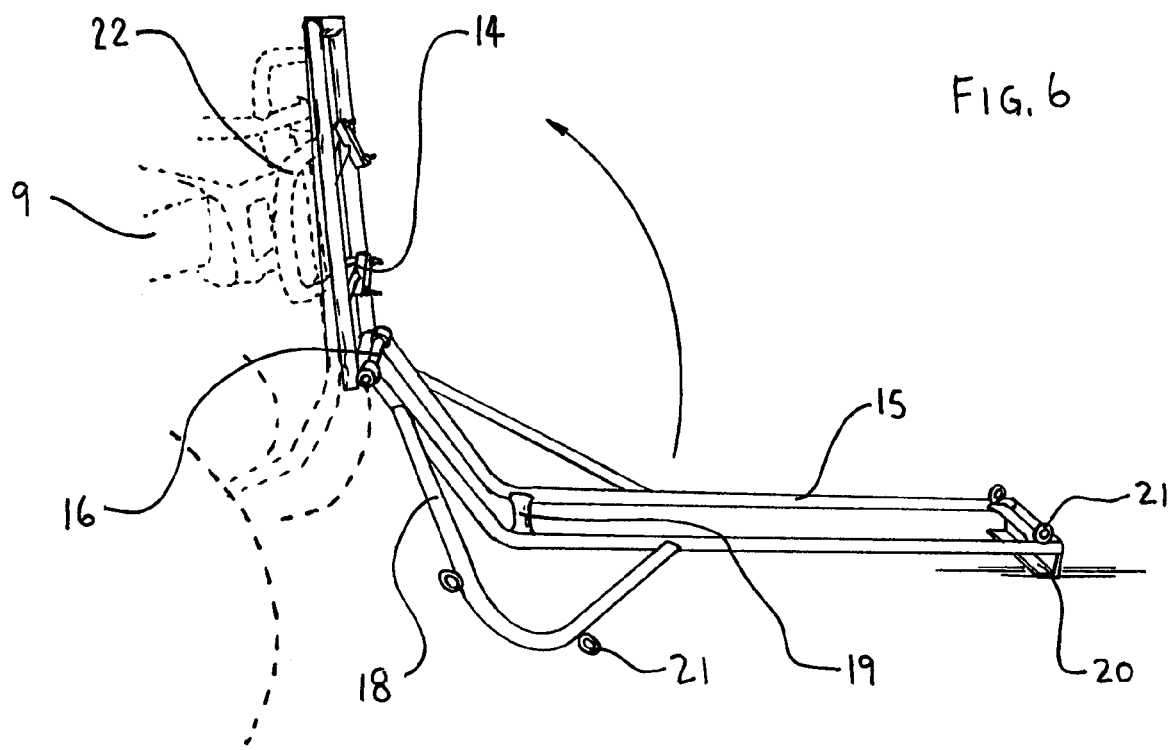
FIG. 6 is a perspective view of the deer carrier rack attached to the front of an ATV vehicle.

Turning now to FIG. 6, the deer carrier rack is shown in the deployed position. The dogleg rods 15 are essentially parallel to the ground, but are suspended slightly from the ground by the carrier ground brace 20. The ground brace is located at the outer end of the dogleg rods. This carrier ground brace 20 is generally "L" shaped as best shown in FIG. 6.

Eyelets 21 are also attached at the end of the dogleg rods and to the wing pieces as shown. These eyelets are used to attach the deer to the rack in its deployed position and t secure the deer and the rack itself to the ATV in an essentially upright position for transportation.

Figure 7:
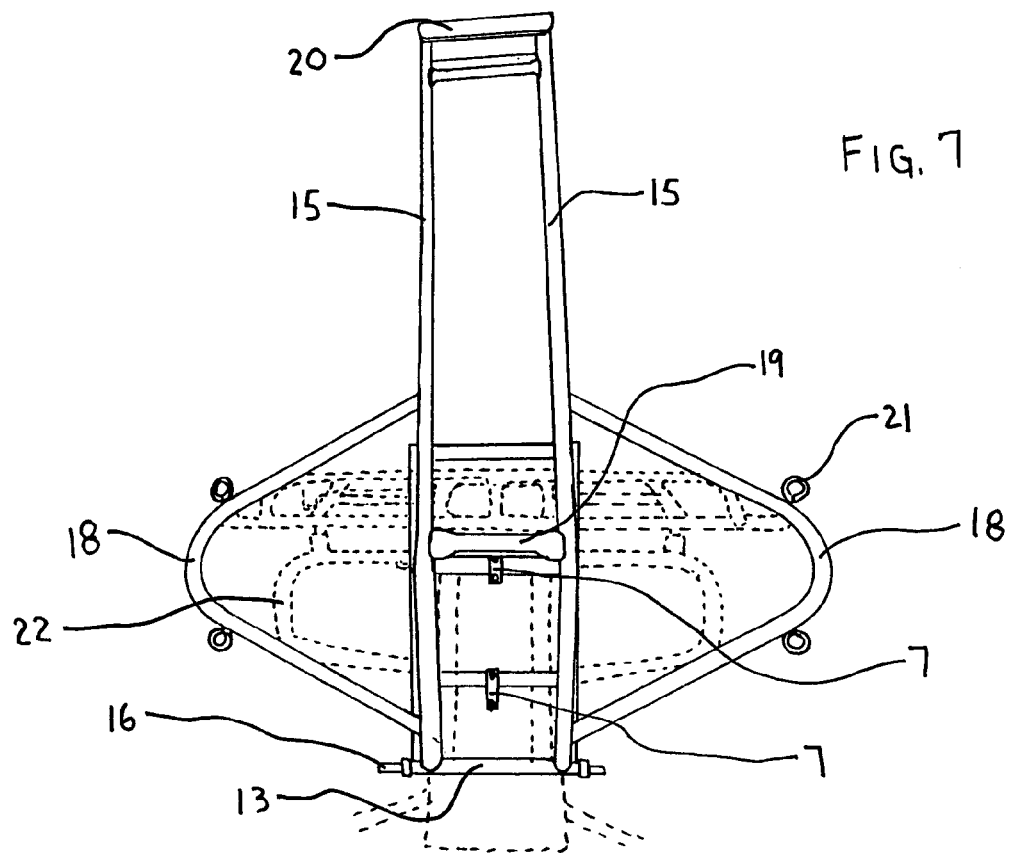
FIG. 7 is a front view of the deer carrier rack attached to an ATV vehicle.

The deer carrier rack 11 is readily and adjustably attached to the front rack 22 of an ATV as shown in the FIG. 7. "U" clamps 7 secure the attaching bars 14 to the ATV front rack 22.

Figure 8:
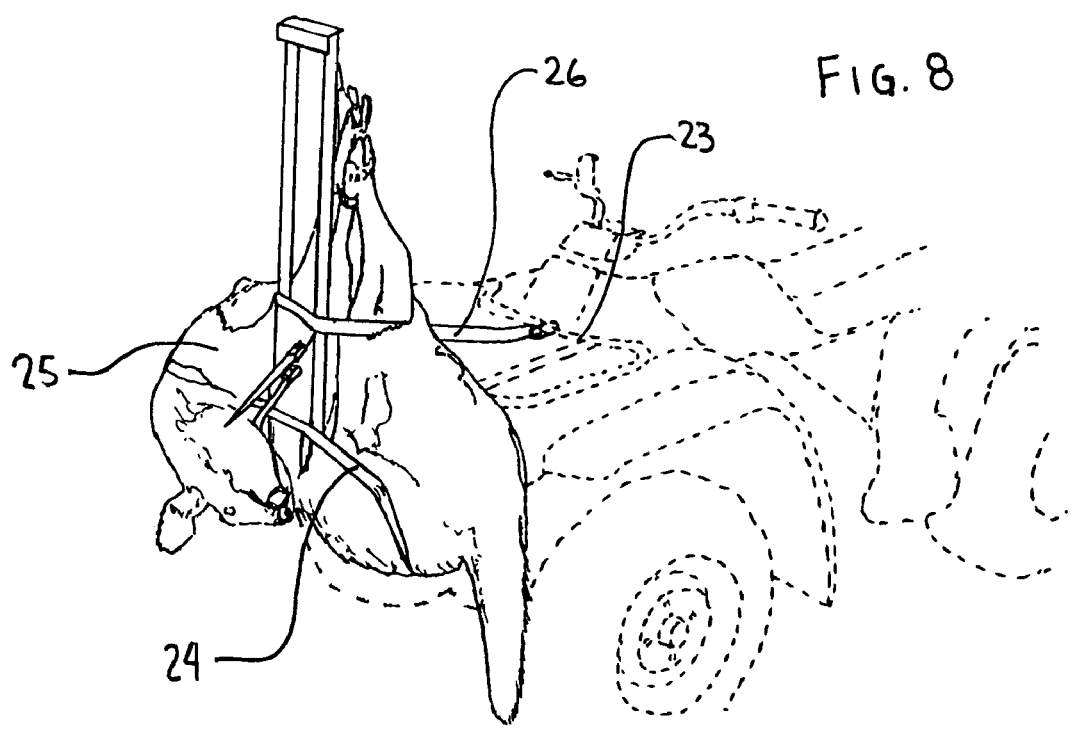
FIG. 8 is a perspective view of the deer carrier rack showing a deer as it is secured in the loaded condition.

As best shown in FIG. 8, the deer is transported in an essentially vertical position. The deer 25 is first loaded and then secured and strapped to the dogleg and wing pieces by deer straps 24. The dogleg rods are then rotated to the essentially vertical position shown in FIG. 8. A strap 26 then secures the lower deer support frame in the essentially vertical position by attaching the hinged support frame to a suitable rail 23 located near the front handle bar section of the ATV.

Figure 9:
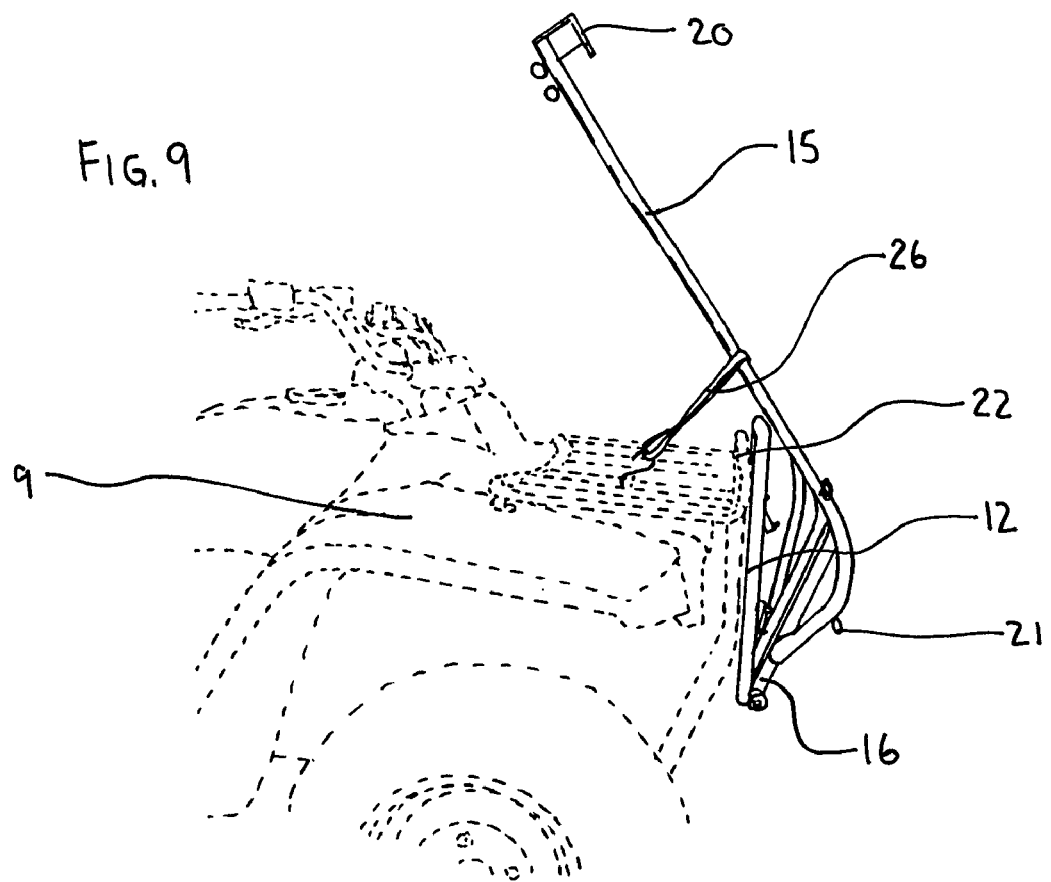
FIG. 9 is a partial perspective view of the deer carrier rack shown in its empty but upright position.

When not carrying a deer, the lower deer support frame deer is deployed in the essentially vertical position as shown in FIG. 9. The strap 26 secures the dogleg rods and wing pieces. The lower deer-carrying portion of the deer rack is transported up and off of the ground as shown.

Generally, the deer-stand rack and deer-carrying rack frames may be made of tubular aluminum, steel, or other strong type of framing material. While the preferred embodiment includes the use of tubular steel, steel having a square or rectangular cross section or other configuration may also be utilized in constructing these racks while still keeping within the spirit and disclosure of the invention.

Although the dogleg and winged shape for the deer-carrying portion of the rack is described herein, it is to be appreciated that any general shape for the rack can be utilized. The embodiment shown and described for the deer carrier rack is meant as a means of illustration only and not as a limitation. Minor variations of the exact design or angles of the rack are still within the keeping of this disclosure. While the deer-stand holder rails are shown as having an oblique angle with respect to the frame, they may have a lesser degree or greater degree of angle, or maybe perpendicular to the frame while still keeping within the spirit and disclosure of this invention.

Having fully described my device, I claim:

1. A deer-carrier rack for an all terrain vehicle, comprising:

an attaching frame attached in an upright orientation to an end of an all-terrain vehicle spaced above a surface on which the vehicle is supported, the attaching frame having a lower end and an upper end, the lower end having a generally upstanding face facing outwardly from the vehicle; and a rigid deer support frame comprising spaced apart left and right generally co-extensive elongate dog leg rods, said rods forming a lever-like lift for lifting a deer between a deployed ground level position and an upright traveling position secured to the all-terrain vehicle, each of the rods having an axle end and an opposite outer end, the outer end of each of the rods having a length which is at least two times greater than a length of the axle end thereof, said rods having a concave portion connecting said axle end and said opposite outer end, the axle ends of the rods being rotatably attached to the upstanding face of the lower end of the attaching frame for generally upward and downward rotation of the deer support frame relative thereto between said deployed position wherein the axle ends of the rods extend downwardly and outwardly from the lower end of the attaching frame, and said upright position wherein the axle ends of the rods extend upwardly and outwardly from the lower end of the attaching frame, the outer ends of the dog leg rods being angularly related to the axle ends at an obtuse angle such that the axle ends and portions of the outer ends adjacent thereto form said concave portion of the dog leg rods located directly adjacent to the lower end of the attaching frame and oriented so as to face upwardly when the deer support frame is in the deployed position, and so as to face the attaching frame and define and bound a space therebetween when the deer support frame is in the upright position, said concave portion sized to carry and support said deer in said deployed and upright positions, the deer support frame including wing pieces adjacently connected to said concave portion and including elements configured for securing of said deer thereto, said wing pieces and said concave portion forming a generally horizontal support surface for said deer when in said deployed position and extending outwardly from the dog leg rods on opposite sides of the concave portion, respectively, directly adjacent to the lower end of the attaching frame, the wing pieces and the concave portion forming a sidewardly extending cradle shaped structure directly adjacent to the lower end of the attaching frame, the cradle shaped structure being configured for receiving and holding said deer against the lower end of the attaching frame in the space defined between the attaching frame and the concave portion when the deer support frame is in the upright position;

wherein when the deer support frame is in the deployed position the outer ends of the dog leg rods will extend at least generally horizontally so as to form an unobstructed generally horizontal platform contiguous with the cradle shaped structure to allow said deer to be loaded onto the platform and positioned against the cradle shaped structure, and wherein the deer support frame with said deer supported thereon positioned against the cradle shaped structure can be rotated upwardly to the upright position such that the cradle shaped structure will contain and hold the deer against the lower end of the attaching frame, and at least one element configured for holding the deer support frame in the upright position with said deer contained and held by the cradle shaped structure.

2. The deer carrier rack of claim 1, wherein said elements configured for securing of said deer comprise eyelets.

3. The deer carrier rack of claim 1, wherein each of said dog leg rods is a unitary member.

4. The deer carrier rack of claim 1, wherein the at least one element configured for holding the deer support frame in the upright position comprises a strap connectable between the deer support frame and the vehicle.

5. The deer carrier rack of claim 1, wherein said outer end of the deer support frame is rotated over vertical when in the upright position.

6. The deer carrier rack of claim 1, wherein the attaching frame is adjustably attached to the vehicle.

7. A deer-carrier rack for an all terrain vehicle, comprising:
   an attaching frame attached in an upright orientation to an end of an all-terrain vehicle spaced above a surface on which the vehicle is supported, the attaching frame having a lower end and an upper end, the lower end having a generally flat upstanding face facing outwardly from the vehicle; and
   a rigid deer support frame comprising spaced apart left and right generally co-extensive elongate dog leg rods, said rods forming a level-like lift for lifting a deer between a deployed ground level position and an upright traveling position secured to the all-terrain vehicle, each of the rods having an axle end and an opposite outer end, the outer end of each of the rods having a length which is at least two times greater than a length of the axle end thereof, said rods having a concave portion connecting said axle end and said opposite outer end, the axle ends of the rods being rotatably attached to the upstanding face of the lower end of the attaching frame for generally upward and downward rotation of the deer support frame relative thereto between said deployed position wherein the axle ends of the rods extend downwardly and outwardly from the lower end of the attaching frame, and said upright position wherein the axle ends of the rods extend upwardly and outwardly from the lower end of the attaching frame, the outer ends of the dog leg rods being angularly related to the axle ends at an obtuse angle such that the axle ends and portions of the outer ends adjacent thereto form said concave portion of the dog leg rods located directly adjacent to the lower end of the attaching frame and oriented so as to face upwardly when the deer support frame is in the deployed position, and so as to face the attaching frame and define and bound a space therebetween when the deer support frame is in the upright position, said concave portion sized to carry and support said deer in said deployed and upright positions, the deer support frame including wing pieces adjacently connected to said concave portion and including eyelets for securing of said deer, said wing pieces and said concave portion forming a generally horizontal support surface for said deer when in said deployed position and extending outwardly from the dog leg rods on opposite sides of the concave portion, respectively, directly adjacent to the lower end of the attaching frame, the wing pieces and the concave portion forming a sidewardly extending cradle shaped structure directly adjacent to the lower end of the attaching frame, the cradle shaped structure being configured for receiving and holding said deer against the lower end of the attaching frame in the space defined between the attaching frame and the concave portion when the deer support frame is in the upright position;
   wherein when the deer support frame is in the deployed position the outer ends of the dog leg rods will extend at least generally horizontally so as to form an unobstructed generally horizontal platform contiguous with the cradle shaped structure to allow said deer to be loaded onto the platform and positioned against the cradle shaped structure, and wherein the deer support frame with said deer supported thereon positioned against the cradle shaped structure can be rotated upwardly to the upright position such that the cradle shaped structure will contain and hold the deer against the lower end of the attaching frame, said outer ends being rotated over vertical when in said upright position, and a strap securing said over vertical outer ends to said all-terrain vehicle when said deer support frame is in the upright position.

8. The deer carrier of claim 7, wherein each of the said dog leg rods is a unitary member.

9. The deer carrier of claim 7, wherein the attaching frame is adjustably attached to the vehicle.

* * * * *